April 11, 1967
R. L. MAYNARD
3,314,026
AUTOMATIC BANDPASS CONTROL
Original Filed Oct. 1, 1962
2 Sheets-Sheet 1
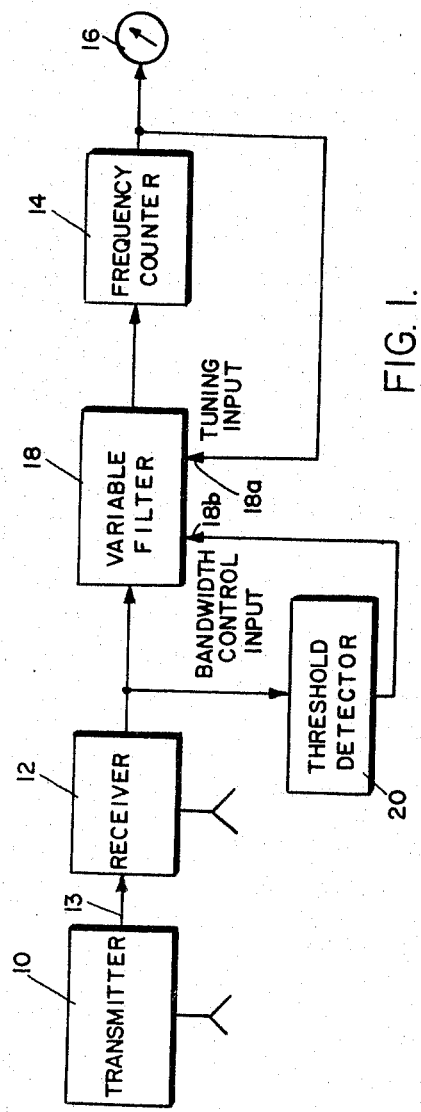
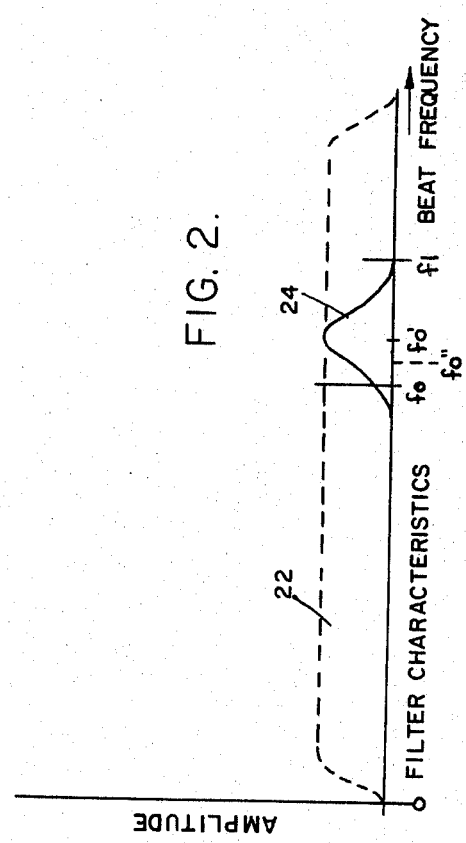
INVENTOR
ROBERT L. MAYNARD April 11, 1967  R. L. MAYNARD  3,314,026
AUTOMATIC BANDPASS CONTROL
Original Filed Oct. 1, 1962  2 Sheets-Sheet 2
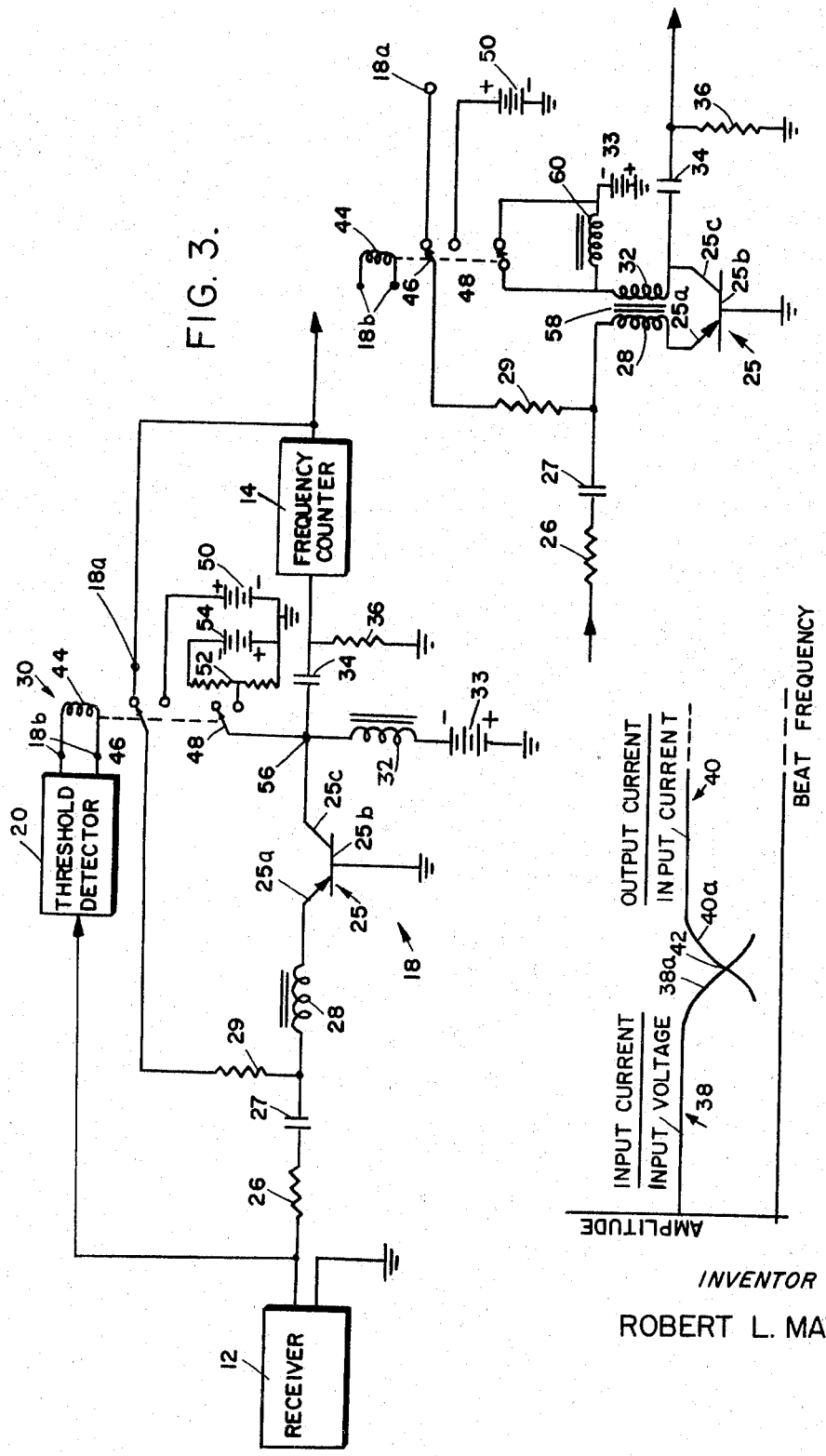
INVENTOR
ROBERT L. MAYNARD

United States Patent Office

3,314,026
Patented Apr. 11, 1967

3,314,026
AUTOMATIC BANDPASS CONTROL
Robert L. Maynard, Nashua, N.H., assignor to Sanders Associates, Inc., Nashua, N.H., a corporation of Delaware
Original application Oct. 1, 1962, Ser. No. 227,357, now Patent No. 3,218,641, dated Nov. 16, 1962. Divided and this application Mar. 4, 1965, Ser. No. 445,816
15 Claims. (Cl. 333—17)

This invention relates to an improved FM radio ranging system and more particularly to an FM altimeter. In an altimeter of this type, the transmitted and received signals are combined in a mixer whose output frequency is indicative of altitude, and the invention is specifically directed to a band-pass control system which automatically centers a filter at the beat frequency so as to minimize the effects of noise in the determination of this frequency. This application is a division of my copending patent application filed Oct. 1, 1962, Ser. No. 227,357, Patent No. 3,218,641.

An altimeter of the type to which my invention is directed makes use of a transmitter whose frequency is periodically swept back and forth. The output of the transmitter is directed from the vehicle toward the earth's surface, and the reflected signal is applied to one input of a mixer. The other input of the mixer is obtained directly from the transmitter. The frequencies at the two mixer inputs differ by the amount of the change in frequency of the transmitter during the time it takes for the transmitted signal to traverse the path to the earth and return. Therefore, this frequency difference, i.e., the beat frequency, which appears at the output of the mixer, depends on the altitude of the transmitter. The beat frequency is generally measured by means of a cycle counter which provides an output voltage dependent on frequency and thus indicative of altitude.

A particularly troublesome error-causing factor in systems of this type is noise, which when present with the beat frequency signal, can cause an erroneous determination of the frequency. The noise is generated by a number of sources. For example, it may be present at low beat frequencies, corresponding to low altitudes, because of leakage of energy from the transmitting antenna directly to the receiving antenna. Also, the receiver may pick up reflections from various parts of an aircraft using the altimeter. A number of higher frequency noise sources are also present. The problem is particularly troublesome in aircraft altimeters because the transmitter power in such installations is limited by such considerations as weight and size and also because there are restrictions on the relative placement of the transmitting and receiving antennas.

A well-known prior system intended for the reduction of noise makes use of a tunable low pass filter in the beat frequency section of the altimeter. The filter is automatically tuned to pass only the altitude-indicating beat frequency signals and all signals of lower frequency and thus exclude high frequency noise. An important limitation in the use of this system in altimeters stems from the fact that the signal is lost at various times during a flight, e.g., during such maneuvers as rolls and turns, when the antennas are not directed downwardly from the aircraft. When the signal reappears, the filter must be reset to the beat frequency. This has been accomplished by tuning the filter back and forth so as to sweep the entire beat frequency band; the system then automatically determines which of any signals passed by the filter is the correct one. This period, during which the altimeter is effectively disabled, often takes an inordinate length of time, with a consequent degrading of reliability.

Other problems associated with prior beat frequency filters include inability to tune over a wide range of beat frequencies, low dynamic amplitude capability and circuit complexity. The resulting low reliability of altitude indication has been largely responsible for the failure of FM altimeters to gain widespread commercial adoption.

Accordingly, it is a principal object of the present invention to provide an FM radio ranging system having improved accuracy of range indication. A more specific object is to provide an FM radio ranging system having improved noise rejection characteristics in the beat frequency section.

Another object is to provide a ranging system of the above type which commences operation within a short period of time following the reception of a reliable reflected signal.

A further object of the invention is to provide a ranging system of the above type in which the beat frequency section has means for automatically tuning itself to the correct beat frequency signal.

Yet another object of the invention is to provide a ranging system of the above type which is reliable in operation.

A still further object is to provide a ranging system of the above type which is small in size and weight and therefore practical for airborne operation.

Another object of the invention is to provide an improved tunable filter for use in a ranging system of the above type.

The invention accordingly comprises the features of construction, combinations of elements and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIG. 1 is a schematic diagram in block form of a ranging system incorporating the present invention.

FIG. 2 is a simplified graphical representation of signal and noise energy in the beat frequency band and the relationship of such energy to the passband of the beat frequency filter used in the ranging system of FIG. 1.

FIG. 3 is a schematic diagram of the variable bandpass filter preferred for use in the ranging system.

FIG. 4 is a graphical representation of the input and output attenuation characteristics of the filter of FIG. 3, and FIG. 5 is a schematic diagram of a somewhat different embodiment of the filter of FIG. 2.

The principles of the invention will be best understood by reference first to FIG. 1, from which it is seen that an altimeter embodying the invention includes a frequency modulated transmitter 10 arranged to transmit a signal toward the earth's surface. A receiver 12 receives the reflected signal and an attenuated output from the transmitter 10 is applied directly to the receiver by way of a transmission line indicated at 13. The circuit may also include a variable phase shifter (not shown) connected between the transmitter and receiver for operation in accordance with the invention disclosed in the co-pending application of Blitz, Ser. No. 286,966, Patent No. 3,166,064, for FM Altimeter With Reduced Step Error.

The receiver 12 includes a mixer (not shown) which mixes the reflected transmitter signal and the attenuated signal on the line 13, to provide a beat frequency signal whose frequency is measured by a frequency counter 14. The output of the counter 14 is registered by an indicator which may take the form of a meter 16 calibrated in terms of altitude. The over-all operation of the elements 10–16 is similar to that of prior FM altimeters. Thus, the counter 14 may be of the type disclosed in U.S. Patents Nos. 2,137,859 and 2,228,367, preferably modified somewhat as set forth below.

Interposed between the receiver 12 and the counter 14 is a variable band-pass filter 18 which is variable not only as to the frequency to which it is tuned, but also with regard to its bandwidth. Tuning of the filter is controlled by the output signal of the counter 14, as applied to a tuning input 18a. Since, as pointed out above, the output voltage of the counter 14 is an analog of the beat frequency as well as the altitude, tuning of the filter in this manner stabilizes it at the frequency corresponding to the correct altitude once that frequency has been initially determined. Furthermore, once the filter is stabilized in this manner, variations in altitude will result in frequency variations within the passband of the filter and the resulting changes in the output voltage signal of the counter 14 cause the filter 18 to track these changes.

On the other hand, the bandwidth of the filter 18 is controlled in accordance with the amplitude of the output of the mixer in the receiver 12. A threshold detector 20 is connected to a bandwidth control input 18b of the filter, so as to provide a wide bandwidth when the amplitude is below a certain threshold level, corresponding to the absence of a reliable received signal. The bandwidth then covers the entire beat frequency range. This state of the filter may be termed the "acquisition state," since it permits fast acquisition of the correct beat frequency signal when a reliable signal is intercepted by the receiver.

More specifically, with reference to FIG. 2, when the amplitude of the received signal is below the threshold level, the filter 18 has a frequency characteristic represented by the curve 22. When the amplitude of the received signal increases above the threshold level, the detector 20 (FIG. 1) emits a signal to the filter input 18b to narrow the bandwidth and at the same time the output voltage of the counter 14, as applied to the tuning input 18a, tunes the filter to the frequency determined by the counter.

However, the frequency measured by the counter does not at this point necessarily correspond to the altitude to be determined by the system. This can be seen from FIG. 2 by assuming that the output voltage of the receiver 12 includes a first component at a frequency $f_0$, the beat frequency derived from the reflected transmitter signal and thus indicative of the true altitude. In addition, there is a noise voltage having a frequency $f_1$. The noise introduces an error in frequency determination so that the output signal of the counter 14 corresponds to a frequency $f_0'$ between $f_0$ and $f_1$. With the threshold level set to narrow the filter bandwidth only when the signal-to-noise ratio at the output of the receiver 12 is greater than unity, the amplitude of the $f_0$ component will be greater than the noise amplitude at the frequency $f_1$.

Accordingly, the frequency $f_0'$ ascertained by the counter 14 is closer to $f_0$ than to $f_1$. Thus, as the bandwidth of the filter contracts and tends to bracket the frequency $f_0'$ within the narrowed passband (indicated at 24) in response to the output signal of the counter 14, the filter excludes a greater proportion of the noise ($f_1$) than the altitude indicating signal ($f_0$).

In other words, there is a greater predominance of the altitude indicating signal at the output of the filter than before. The error in frequency determination is thus reduced and the frequency meter indicates a frequency $f_0''$ closer to $f_0$ than $f_0'$. This, in turn, tunes the filter to a frequency closer to $f_0$, thereby moving the output indication of the frequency counter even closer to the correct value. This process continues until finally the output of the counter 14 corresponds to the true altitude and the filter 18 is stabilized at the frequency $f_0$.

The interval between the appearance of a satisfactory signal level and stabilization of the system at the correct beat frequency is of the order of 0.1 second, a time considerably shorter than obtainable with the prior frequency hunting system and short enough for use in present day high speed aircraft. Moreover, the circuit used to accomplish stabilization at the correct beat frequency is simple and reliable, as will be apparent from the detailed description of the filter set forth below.

The threshold detector 20, which may be of conventional design, is set to narrow the bandwidth of the filter 18 when the output voltage of the receiver 12 reaches a level at which the signal component in the voltage is sufficient to provide reliable altitude measurement. That is, when the threshold level is reached, the signal component exceeds the noise component in the receiver output voltage by an amount sufficient for operation in the manner described. It will be apparent that the threshold may be detected in other portions of the receiver than the output thereof and also that other well-known techniques than a mere sensing of the combined signal and noise amplitude can be used to determine the presence of a sufficiently strong signal. In each case, a detector determines directly or indirectly whether or not the signal-to-noise ratio at the output of the receiver is above or below a threshold level. For example, when a simple amplitude sensing device is used as described, it is assumed that when the combined amplitude exceeds a specified amount, the signal-to-noise ratio is above the threshold level.

With reference now to FIG. 3, the filter 18 includes a transistor 25 connected in a common base circuit. The input circuit of the transistor comprises a resistor 26, a D.-C. blocking capacitor 27 and a saturable inductor 28, in series with the output of the receiver 12 and between the emitter 25a and base 25b. A resistor 29 is connected in series with the contacts of a relay 30 between the tuning input 18a and the junction between the capacitor 27 and inductor 28.

The output circuit of the filter includes a second saturable inductor 32 in series with a power supply, illustratively a battery 33, between the collector 25c and base 25b of the transistor. Also included are a D.-C. blocking capacitor 34 and a load resistor 36.

In the following discussion, the values of circuit parameters will be indicated by means of conventional symbols followed by subscripts denoting the particular circuit elements to which the parameters relate. For example, the resistance of the resistor 26 is designated $R_{26}$.

The input resistance $R_{26}$ may be assumed to include the output resistance of the receiver 12, and similarly, the load resistance $R_{36}$ may be assumed to include the input resistance of the counter 14.

The input current of the transistor 25 for a given receiver output voltage is plotted against frequency in the curve 38 of FIG. 4. As shown therein, the input circuit is a low pass filter, and the current is therefore essentially independent of frequency at low frequencies where the inductive reactance $X_{28}$ is small compared to the resistance $R_{26}$ (neglecting for the present the effect of $R_{29}$). At high frequencies, $X_{28}$ becomes appreciable and the input current drops off as indicated by the sloping portion 38a of the curve.

Similarly, the output voltage developed across the resistor 36 for a given input current is represented by the curve 40. The resistor 36 and inductor 32 may be considered to be connected in parallel because of the low impedance of the capacitor 34. Accordingly, the output circuit is a high pass filter, and at high frequencies, where the reactance $X_{32}$ is large compared to the resistance $R_{36}$, the output voltage is essentially independent of frequency. However, as the frequency is decreased, with a corresponding decrease in $X_{32}$, the output voltage for a given output current diminishes, as indicated by the portion 40a of the curve 40.

The output current of the transistor 25 is directly proportional to the input current, and therefore, the output voltage characteristic of the filter is proportional to the product of the functions represented by the curves 38 and 40. Thus, the frequencies passed by the filter lie in a band centered at the crossover point 42 of the curves 38 and 40. The width of the passband depends on the amount of overlap of the two curves, and this, in turn, depends on the relative values of the inductance/resistance ratios, $L_{28}/R_{26}$ and $L_{32}/R_{36}$. In particular, the bandwidth can be broadened by decreasing $L_{28}/R_{26}$ or increasing $L_{32}/R_{36}$.

Moreover, the filter 18 can be tuned, i.e., the passband shifted, by increasing or decreasing both ratios. If both the ratios are increased, the passband moves downward in frequency. If the ratios are decreased, the passband shifts to a higher frequency. The manner in which this function is accomplished is as follows:

With further reference to FIG. 3, the output signal of the counter 14 is a positive direct voltage level, with the level increasing as the frequency measured by the counter increases. With the relay 30 in the illustrated position, this voltage is applied to the resistor 29 and results in the flow of direct current through the emitter-base circuit of the transistor 25 by way of the inductor 28. Since the inductor is a saturable inductor, an increase in such current, resulting from an increase in the frequency measured by the counter 14, decreases the inductance $L_{28}$, whereas a decrease in the measured frequency results in an increase in $L_{28}$.

More specifically, from the above discussion it is seen that when both inductances are increased, the passband of the filter 18 moves downward in frequency. An increase in inductance is the result of a decrease in the output voltage of the counter 14, corresponding to a decrease in the frequency measured by the counter. Similarly, a decrease in inductance, resulting in an upward shift of the passband, follows an increase in the frequency measured by the counter. Thus, the changes in inductance resulting from voltage changes at the tuning input 18a are such as to cause the passband of the filter 18 to follow changes in the frequency determined by the counter 14.

It is often desirable that the output voltage of the counter 14 have a logarithmic or similar relationship to the frequency measured by the counter. This provides a relatively expanded scale on the meter 16 at low altitudes, where high resolution is important, and a relatively compressed scale at higher altitudes, where resolution is not so important. This can be provided, for example, by applying the linear output of the frequency counter disclosed in U.S. Patent No. 2,228,367 across a voltage divider comprising an ordinary resistor and a semiconductive resistor connected in series. The semiconductive resistor is of the type in which the resistance varies inversely with the current through and thus inversely with the voltage applied across the voltage divider.

The counter 14 output signal (for the meter 16 and the filter tuning input 18a) is the voltage across the semiconductive resistor. This voltage increases along with the voltage applied to the voltage divider. However, it increases by a lesser amount, owing to the reduction in resistance of the semiconductive resistor as the applied voltage increases. Thus, the desired frequency-output voltage characteristic is obtained, and close conformity to a specified curve can be accomplished by adjusting the resistances of the voltage divider and the signal sources for the divider.

The use of a non-linear frequency-voltage characteristic of the above type facilitates tracking of the measured frequency by the filter 18. This results from the fact that the relationship between the inductance of a saturable inductor and the saturating current applied to the inductor has a similar characteristic.

In this connection, it is noted that ordinarily the current through the inductors should be directly proportional to the modified output voltage of the counter 14. For this purpose, it is desirable that the resistance $R_{29}$, which may be assumed to include the output resistance of the counter 14 (taking into consideration the aforementioned voltage divider), be substantially greater than the input resistance of the transistor 25 so as to minimize variations in the latter resistance.

Also, for reasons of simplicity of manufacture and adjustment of the circuit, it is desirable that the inductors 28 and 32 be identical. The direct current passing through the two inductors should therefore be substantially equal, and this is accomplished by use of the common base circuit, as illustrated, which has a unity current gain. Another requirement for unity current gain is that the output resistance of the transistor 25 be substantially greater than the resistance $R_{36}$, a requirement which is easily met with the common base configuration because of the high output resistance associated therewith.

When the inductances $L_{28}$ and $L_{32}$ are equal, it is desirable that the resistances $R_{24}$ and $R_{36}$ also be equal, or at least of the same order of magnitude, so that the curves 38 and 40 (FIG. 4) intersect at a point providing a suitable passband characteristic for the filter 18. Also, in order to provide a linear amplitude characteristic in the filter, the input current should be linearly related to the output voltage of the receiver 12. This, in turn, requires that the resistance $R_{24}$ be substantially greater than the input resistance of the transistor 25. This criterion is easily met because of the low input resistance of the common base configuration.

Preferably, the resistance $R_{29}$ should be substantially greater than the resistance $R_{26}$ so that essentially all of the input current for the filter flows through the emitter 25a, with minimal wastage of power in the resistor 29. It should be noted that, with this relationship between $R_{29}$ and $R_{26}$, the resistor 29 has negligible effect on the frequency characteristic of the input current in the transistor 25. In any case, even if $R_{29}$ is of the same order of magnitude as $R_{24}$, operation in the above manner can be obtained by noting that $R_{29}$ and $R_{24}$ may be considered to be in parallel for the purpose of determining the frequency characteristic of the transistor input current. A construction of this type therefore falls within the scope of the present invention.

The bandwidth of the filter 18 is controlled by means of the relay 30, whose coil 44 is energized by the threshold detector 20 when the output voltage of the receiver 12 exceeds the threshold level. In this condition, a relay contact 46 connects the resistor 29 to the output of the counter 14 and a relay contact 48 is unconnected, thereby providing for automatic tuning of the filter 18 in the manner described above.

When the output signal of the receiver 12 drops below the threshold level, the relay coil 44 is de-energized. The contact 46 then shifts to a battery 50 and the contact 48 becomes connected to a voltage divider 52 connected across a battery 54. The voltage of the battery 50 is such as to provide a current in the inductor 28 which saturates the inductor sufficiently to shift the upper frequency limit of the passband of the filter to the highest frequency in the beat frequency range. That is, the ratio $L_{28}/R_{26}$ is decreased to the point where the sloping portion 38a of the curve 38 (FIG. 4) is shifted to the right so as to include the highest frequency within the range of frequencies encountered by the filter 18.

The voltage of the battery 54 and the position of the tap on the voltage divider 52 are such that the voltage at the junction 56 between the inductor 32 and the collector 25c is equal to the voltage across the battery 33. Thus, no current flows through the inductor 32, and its inductance is at a maximum. The ratio $L_{32}/R_{36}$ when $L_{32}$ is at a maximum, is such that the lower frequency limit of the filter determined by this ratio is at the lowest frequency in the beat frequency range. That is, the sloping portion 40a of the curve 40 (FIG. 4) is at the lowest beat frequency. Thus, the overlap of the curves 38 and 40 is sufficiently great to provide a broad passband in the filter 18, including the entire beat frequency range.

Preferably, the impedance presented by the voltage divider 52 to the output of the transistor 25 is substantially greater than the resistance $R_{36}$ so that, when the voltage divider is connected into the circuit, its effect on the gain of the filter is negligible.

It will be apparent that other means of changing the L/R ratios in switching from the narrow band to the broad band condition may be utilized. For example, a non-saturable inductor might be switched in series with the saturable inductor 32.

Still referring to FIG. 3, when the filter 18 is in the broad band condition, the system is in the "acquisition" state as mentioned above. As previously described, appearance of a signal above the threshold level results in switching of the filter to the narrow band condition in which it tracks the altitude-indicating beat frequency signal. This is accomplished by means of the threshold detector 12 which energizes the relay coil 44. The contacts 46 and 48 shift to remove the bias supplied by the batteries 50 and 54 in the broad band condition and the amount of overlap of the input and output response curves 38 and 40 is reduced to an amount illustrated for example by FIG. 4. Moreover, the shifting of the contact 46 provides for control of the center frequency of the passband of the filter 18, i.e., tuning of the filter, by the output signal of the counter 14.

Thus, the filter tends to shift to the frequency registered by the counter 14. Since this frequency may be determined in part by noise, there may be a resultant error therein with a corresponding error in the altitude indication. However, the narrowing of the filter passband, together with the tuning of the filter to the apparent beat frequency, excludes a substantial portion of the noise input at the counter 14, and this reduces the error in the output signal of the counter. Consequently, the filter is tuned to a frequency closer to the correct frequency, and this in turn results in a further reduction in error. The process continues until the filter is stabilized at the correct frequency.

It will be noted that the filter 18 has a simple design and is composed of a relatively small number of components which are readily adaptable for miniaturization techniques. Moreover, a tuning ratio of 500:1 between upper and lower frequencies has been obtained, and the amplitude range is in excess of 60 db. The system has excellent reliability characteristics, both because of the novel manner in which acquisition of a signal is performed and also because of the inherent reliability of the filter itself.

In FIG. 5 I have illustrated a modified version of the filter 18. The inductors 28 and 32 have a common core indicated at 58. Thus, in addition to the inductances which the two inductors contribute in the input and output portions of the filter circuit, there is coupling between the inductors, providing positive feedback from the inductor 32 to the inductor 28. The feedback sharpens the filter response. That is, it provides a narrower passband when the filter is in the narrow band condition.

It will be noted that saturation of the inductor 28 of FIG. 5 results in similar saturation of the inductor 32. Therefore, the bandwidth cannot be varied as in FIG. 3. Thus, where a variable bandwidth is desired, e.g., in the ranging system disclosed herein, it will be accomplished by other means. For example, the relay 30 may connect a non-saturable inductor 60 into the circuit in obtaining the wideband condition.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:
1. A variable filter comprising, in combination,
   (a) a transistor connected for a low input resistance and a high output resistance,
   (b) an A.C. frequency signal source, a third resistance and a first saturable inductance connected in series with said input resistance and thereby providing an input for said transistor,
   (c) a load connected to the output of said transistor, said load comprising the parallel combination of a second saturable inductance and a fourth resistance, and
   (d) means for varying the filter characteristics of the combinations of said inductors and said resistors from a slight overlap to a substantial overlap of the frequencies passed by said combinations by varying the D.C. bias applied to the input circuit of the said transistor through said first inductance.

2. A variable filter comprising, in combination,
   (a) a transistor connected for a low input resistance and a high output resistance,
   (b) a first inductor in series with said input resistance,
   (c) a third resistance connected to said first inductor,
   (d) the input circuit of said filter including said input resistance, said first inductor and said third resistance,
   (e) a second inductor in series with the output resistance of said transistor,
   (f) a fourth resistance connected to said second inductor,
   (g) a power supply connected to power said transistor through said second inductor,
   (h) said inductors being saturable,
   (i) means for passing a unidirectional current through said first inductor and said input resistance, thereby passing a corresponding unidirectional current through said second inductor,
   (j) means for applying a signal to be filtered across said input circuit,
   (k) whereby the frequencies passed by said filter are determined by the ratios of the inductances of said inductors to said resistances connected to said inductors, said ratios being varied by means of said unidirectional current.

3. The combination defined in claim 2 including means for independently varying the unidirectional currents through said inductors, thereby varying the bandwidth of said filter.

4. The combination defined in claim 2 in which said transistor is connected in a common base arrangement, said inductors being substantially identical.

5. The combination defined in claim 2 in which said first inductance and said third resistance functions as a low pass filter for the input current of said transistor and said second inductance and said fourth resistance are connected to function as a high pass filter for the output voltage of said transistor, the characteristics of said low pass and high pass filters overlapping over a substantial portion thereof to define the passband of said variable filter.

6. The combination defined in claim 5 including means coupling said first and second inductors.

7. A variable filter comprising, in combination,
   (a) a transistor connected for a low input resistance and a high output resistance,
   (b) the input circuit of said transistor including the emitter and base thereof,
   (c) the output circuit of said transistor including the collector thereof,
   (d) a first resistor and a first inductor in series with each other and with said emitter and base in said input circuit,
   (e) a second inductor,
   (f) a power supply connected in series with said second inductor and connected to apply a unidirectional potential to said collector,
(g) a second resistor in parallel with said second inductor,
(h) said inductors being saturable, and
(i) means for passing a unidirectional current through said first inductor, whereby a corresponding current passes through said second inductor, thereby to provide similar changes in the inductances of said inductors for tuning of said filter.

8. The combination defined in claim 7 in which said transistor is connected in a common base arrangement, said first and second inductors being substantially identical to each other.

9. The combination defined in claim 8 including means for changing the direct current through said first inductor by an amount substantially different from the change in direct current through said second inductor, thereby to vary the bandwidth of said filter.

10. A variable filter comprising, in combination,
(a) a transistor connected with the collector terminal thereof as one of its output terminals,
(b) a first resistor and a first inductor,
(c) a source of input signal,
(d)
  (1) said inductor being connected to one of the others of the terminals of said transistor, and
  (2) said first inductor, said first resistor and said source being in series between said other terminals,
(e) a second inductor and a power supply connected in series to said collector,
(f) a second resistor in parallel with said second inductor,
(g) said inductors being saturable, and
(h) means for passing a unidirectional input current through said transistor by way of said first inductor thereby to vary the inductances of said first and second inductors.

11. The combination defined in claim 10 including,
(a) a capacitor connected between said first resistor and said first inductor,
(b) a third resistor connected to the junction of said capacitor and said first inductor,
(c) said unidirectional current means being connected to pass said current through said first inductor by way of said third resistor.

12. The combination defined in claim 11 in which the resistance of said first resistor is substantially greater than the input resistance of said transistor and the resistance of said second resistor is substantially less than the output resistance of said transistor.

13. The combination defined in claim 12 in which the resistance of said third resistor is substantially greater than the resistance of said first resistor.

14. The combination defined in claim 10 including,
(a) a second unidirectional potential source and
(b) switching means for applying the voltage of said source to said collector, thereby to change the current through said second inductor by an amount substantially different from the current to said first inductor and thus change the bandwidth of said filter.

15. A variable filter comprising, in combination, a transistor connected for a low input resistance and a high output resistance, a signal source having an output signal to be filtered by said variable filter, a low pass resistance-inductance filter connected to pass an input current through said transistor in response to said signal to said source, a high pass resistance-inductance filter connected to the output of said transistor, the inductor of said high pass filter being in the direct current path of the collector of said transistor, the inductors of both said high pass and low pass filters being saturable, and tuning means connected to pass a unidirectional input current through said transistor by way of said first inductor.

No references cited.

HERMAN KARL SAALBACH, *Primary Examiner.*

M. NUSSBAUM, *Assistant Examiner.*